United States Patent
Lin et al.

(10) Patent No.: US 10,233,123 B2
(45) Date of Patent: Mar. 19, 2019

(54) VARISTOR COMPOSITIONS AND MULTILAYER VARISTOR

(71) Applicant: THINKING ELECTRONIC INDUSTRIAL CO., LTD., Kaohsiung (TW)

(72) Inventors: Yong-Ming Lin, Kaohsiung (TW); Yan-Liang Shih, Kaohsiung (TW); Tui-Ting Tu, Kaohsiung (TW)

( * ) Notice: Subject to any disclaimer, the term of this patent is extended or adjusted under 35 U.S.C. 154(b) by 203 days.

(21) Appl. No.: 15/368,729

(22) Filed: Dec. 5, 2016

(65) Prior Publication Data

US 2018/0099910 A1    Apr. 12, 2018

(30) Foreign Application Priority Data

Oct. 12, 2016    (TW) ............... 105132868 A

(51) Int. Cl.
*C03C 3/15* (2006.01)
*C04B 35/63* (2006.01)
(Continued)

(52) U.S. Cl.
CPC ............ *C04B 35/6303* (2013.01); *C03C 3/15* (2013.01); *C04B 35/453* (2013.01); *C04B 35/6264* (2013.01); *C04B 35/62218* (2013.01); *C04B 35/62685* (2013.01); *C04B 35/638* (2013.01); *C04B 35/6342* (2013.01); *C04B 35/64* (2013.01); *H01C 1/148* (2013.01); *H01C 7/112* (2013.01); *C04B 2235/3217* (2013.01); *C04B 2235/3241* (2013.01); *C04B 2235/3262* (2013.01); *C04B 2235/3275* (2013.01); *C04B 2235/3277* (2013.01); *C04B 2235/3279* (2013.01); *C04B 2235/3284* (2013.01);
(Continued)

(58) Field of Classification Search
CPC ... C04B 35/6303; C04B 35/453; C04B 35/64; C03C 3/15
USPC .......................................................... 338/20
See application file for complete search history.

(56) References Cited

U.S. PATENT DOCUMENTS 3,760,318 A * 9/1973 Masuyama ............ H01C 7/112
29/610.1
6,146,552 A * 11/2000 Iga ........................ C04B 35/453
252/519.5
(Continued)

FOREIGN PATENT DOCUMENTS

CN    1963961 A    5/2007
CN    103396116    * 11/2013    ........... C04B 35/453
(Continued)

*Primary Examiner* — Kyung S Lee
*Assistant Examiner* — Iman Malakooti

(57) ABSTRACT

A varistor composition free of Sb comprising: (a) ZnO; (b) B—Bi—Zn—Pr glass, or B—Bi—Zn—La glass, or a mixture thereof; (c) a cobalt compound, a chromium compound, a nickel compound, a manganese compound, or mixtures thereof; (d) $SnO_2$; and (e) an aluminum compound, a silver compound, or a mixture thereof. By adjusting the ratio between the components, the varistor composition may be made into a multilayer varistor with inner electrodes having a low concentration of noble metals at a sintering temperature less than 1200° C. The multilayer varistor made from the varistor composition has good maximum surge current, good ESD withstand ability, and low fabrication cost.

16 Claims, 1 Drawing Sheet

(51) Int. Cl.
  *C04B 35/453* (2006.01)
  *C04B 35/622* (2006.01)
  *C04B 35/626* (2006.01)
  *C04B 35/634* (2006.01)
  *C04B 35/638* (2006.01)
  *C04B 35/64* (2006.01)
  *H01C 1/148* (2006.01)
  *H01C 7/112* (2006.01)

(52) U.S. Cl.
  CPC ............ *C04B 2235/3287* (2013.01); *C04B 2235/3291* (2013.01); *C04B 2235/3293* (2013.01); *C04B 2235/3418* (2013.01); *C04B 2235/36* (2013.01); *C04B 2235/3813* (2013.01); *C04B 2235/3886* (2013.01); *C04B 2235/44* (2013.01); *C04B 2235/442* (2013.01); *C04B 2235/443* (2013.01); *C04B 2235/447* (2013.01); *C04B 2235/5445* (2013.01); *C04B 2235/6025* (2013.01); *C04B 2235/612* (2013.01); *C04B 2235/656* (2013.01); *C04B 2235/6567* (2013.01)

(56) References Cited

U.S. PATENT DOCUMENTS

| | | | |
|---|---|---|---|
| 7,320,762 B2* | 1/2008 | Greuter | H01C 7/112 252/500 |
| 7,541,910 B2* | 6/2009 | Lien | H01C 7/112 338/20 |
| 7,695,644 B2* | 4/2010 | Kosowsky | H01C 7/1006 252/500 |
| 2005/0143262 A1 | 6/2005 | Sakyo et al. | |
| 2009/0015367 A1 | 1/2009 | Dai | |
| 2012/0153237 A1 | 6/2012 | Youn-Woo et al. | |
| 2013/0133183 A1* | 5/2013 | Lien | C04B 35/453 29/612 |

FOREIGN PATENT DOCUMENTS

| | | |
|---|---|---|
| TW | 200916432 | 4/2009 |
| TW | 201212051 A | 3/2012 |
| TW | 201234394 A | 8/2012 |

* cited by examiner

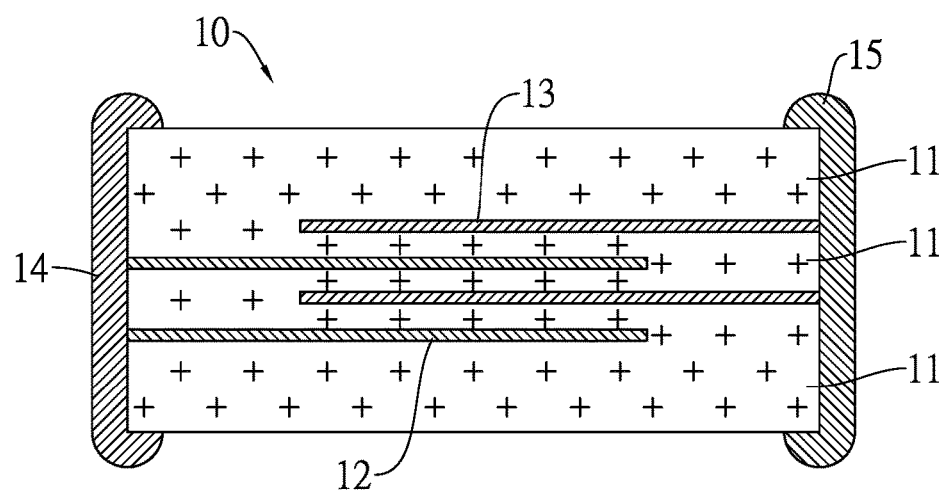

VARISTOR COMPOSITIONS AND MULTILAYER VARISTOR

CROSS-REFERENCE TO RELATED APPLICATIONS

This application is based upon and claims priority under 35 U.S.C. 119 from Taiwan Patent Application No. 105132868 filed on Oct. 12, 2016, which is hereby specifically incorporated herein by this reference thereto.

BACKGROUND

1. Technical Field

The present invention relates to a varistor composition, and more particularly to a varistor composition free of antimony (Sb). The present invention further relates to a multilayer varistor made by sintering the varistor composition at low temperature.

2. Description of the Prior Art(s)

Varistors are excellent at protecting electronic appliances against spurious voltage surges and voltage transients resulting from electro-static discharge (ESD); therefore, varistors are extensively applied as surge protection devices. In addition, multilayer varistors small in sizes are applied intensively under the trend toward slim and compact electronic devices. Due to the hazard of Sb to the environment, conventional varistor materials comprising antimony are reviewed and prohibited with the rising environmental awareness.

To avoid environmental pollution, US2012/0153237 A1, US2005/0143262 A1, and TW200916432 utilize varistor materials comprising praseodymium (Pr) or lanthanum (La) to replace the conventional Sb-containing varistor materials. However, the varistor materials comprising Pr or La are required to be sintered at a high temperature about 1200° C. to fabricate multilayer varistors having good varistor characteristics.

Besides, the above patent documents utilize expensive inner electrodes, such as high-purity platinum (Pt) metal, high-purity palladium (Pd) metal, platinum-silver (Pt—Ag) alloy containing high platinum, and palladium-silver (Pd—Ag) alloy containing high palladium, with the varistor materials comprising Pr or La to fabricate the multilayer varistors, such that the fabrication cost of the multilayer varistors is increased.

To overcome the shortcomings, a varistor composition and a multilayer varistor to mitigate or obviate the aforementioned problems are provided.

SUMMARY

An objective of the present invention is to provide a varistor composition free of Sb, which may be sintered with inner electrodes made of a Pt—Ag alloy having an amount of Pt less than or equal to 30 wt % or a Pd—Ag alloy having an amount of Pd less than or equal to 30 wt %, under a low sintering temperature to prepare a multilayer varistor having high maximum surge current and ESD withstand ability at low fabrication cost. In accordance with an embodiment, the varistor composition free of Sb comprises zinc oxide (ZnO), a first additive, a second additive, a third additive, and a fourth additive. The first additive is selected from the group consisting of: and a mixture thereof. The second additive is selected from the group consisting of: a cobalt compound, a chromium compound, a nickel compound, a manganese compound, and mixtures thereof. The third additive comprises tin dioxide ($SnO_2$). The fourth additive is selected from the group consisting of: an aluminum compound, a silver compound, and a mixture thereof. Based on the total weight of the varistor composition, the total content of the first additive ranges from 0.05 weight percent (wt %) to 20 wt %, the individual content of the second additive ranges from 0.1 wt % to 5.0 wt %, the content of the third additive ranges from 0.1 wt % to 1.5 wt %, and the individual content of the fourth additive ranges from 0.001 wt % to 1.0 wt %.

When the first additive comprises only a single species, said "total content of the first additive" is designated as "the content of the single species of the first additive." For instance, when the first additive comprises only B—Bi—Zn—Pr glass, the total content of the first additive is the content of the B—Bi—Zn—Pr glass. Similarly, when the first additive comprises only B—Bi—Zn—La glass, the total content of the first additive is the content of the B—Bi—Zn—La glass.

When the first additive comprises multiple species, said "total content of the first additive" is designated as "the total of respective contents of the multiple species of the first additive." For instance, when the first additive comprises B—Bi—Zn—Pr glass and B—Bi—Zn—La glass, the total content of the first additive is the total amount of the content of the B—Bi—Zn—Pr glass and the content of the B—Bi—Zn—La glass.

Said "individual content of the second additive" is designated as "the content of a single species of the second additive." For instance, when the second additive is composed of the cobalt compound, the individual content of the second additive ranges from 0.1 wt % to 5.0 wt % Similarly, when the second additive is composed of the chromium compound, the individual content of the second additive ranges from 0.1 wt % to 5.0 wt %; when the second additive is composed of the nickel compound, the individual content of the second additive ranges from 0.1 wt % to 5.0 wt %; when the second additive is composed of the manganese compound, the individual content of the second additive ranges from 0.1 wt % to 5.0 wt %.

In accordance with an embodiment, the second additive is the mixture of the cobalt compound, the chromium compound, the nickel compound, and the manganese compound, and the total content of the second additive ranges from 0.4 wt % to 20.0 wt %.

Said "total content of the second additive" is designated as the total amount of the individual content of multiple species of the second additive. For instance, when the second additive is composed of the cobalt compound, the chromium compound, the nickel compound, and the manganese compound, the total content of the second additive ranges from 0.4 wt % to 20.0 wt %.

In accordance with an embodiment, the cobalt compound of the second additive may be, but is not limited to, a cobalt oxide, cobalt hydroxide [$Co(OH)_2$], a percobaltate, cobalt carbonate ($CoCO_3$), or cobalt phosphate [$Co_3(PO_4)_2$]. For instance, the cobalt oxide and the percobaltate may be, but are not limited to, tricobalt tetraoxide ($Co_3O_4$) and potassium percobaltate ($K_3CoO_4$), respectively.

In accordance with an embodiment, the chromium compound of the second additive may be, but is not limited to, a chromium oxide, a dichromate salt, a chromium boride compound, or a chromium nitride compound. For instance, the chromium oxide may be, but is not limited to, dichromium trioxide ($Cr_2O_3$); the dichromate salt may be, but is not limited to, ammonium dichromate [$(NH_4)_2Cr_2O_7$]; the chromium boride compound may be, but is not limited to, chromium monoboride (CrB) or chromium diboride ($CrB_2$); the chromium nitride compound may be, but is not limited to, dichromium nitride ($Cr_2N$).

In accordance with an embodiment, the nickel compound of the second additive may be, but is not limited to, a nickel oxide, nickel carbonate ($NiCO_3$), or nickel nitrate [$Ni(NO_3)_2$]. For instance, the nickel oxide may be, but is not limited to, nickel monoxide (NiO).

In accordance with an embodiment, the manganese compound of the second additive may be, but is not limited to, a manganese oxide, manganese carbonate ($MnCO_3$), manganese nitrate [$Mn(NO_3)_2$], or manganese borohydride [$Mn(BH_4)_2$]. For instance, the manganese oxide may be, but is not limited to, manganese suboxide ($Mn_2O$) or trimanganese tetraoxide ($Mn_3O_4$).

In accordance with an embodiment, the third additive comprises silicon dioxide ($SiO_2$) or germanium dioxide ($GeO_2$).

Said "individual content of the fourth additive" is designated as "the content of a single species of the second additive." For instance, when the second additive is composed of the aluminum compound, the individual content of the fourth additive ranges from 0.001 wt % to 1.0 wt % Similarly, when the fourth additive is composed of the silver compound, the individual content of the fourth additive ranges from 0.001 wt % to 1.0 wt %.

In accordance with an embodiment, the fourth additive is the mixture of the aluminum compound and the silver compound, and the total content of the fourth additive ranges from 0.002 wt % to 2.0 wt %.

Said "total content of the fourth additive" is designated as the total amount of the individual content of multiple species of the fourth additive. For instance, when the fourth additive is composed of the aluminum compound and the silver compound, the total content of the second additive ranges from 0.002 wt % to 2.0 wt %.

In accordance with an embodiment, the aluminum compound of the fourth additive may be, but is not limited to, aluminum oxide ($Al_2O_3$) or aluminium nitrate [$Al(NO_3)_3$]. The silver compound of the fourth additive may be, but is not limited to, silver oxide ($Ag_2O$) or silver nitrate ($AgNO_3$). Further, the silver compound of the fourth additive may be aluminium nitrate nonahydrate [$Al(NO_3)_3 \cdot 9H_2O$].

In accordance with an embodiment, based on the total amount of B, Bi, Zn, and Pr contained in the B—Bi—Zn—Pr glass, the content of B in the B—Bi—Zn—Pr glass ranges from 20 at % to 70 at %, the content of Bi in the B—Bi—Zn—Pr glass ranges from 2 at % to 30 at %, the content of Zn in the B—Bi—Zn—Pr glass ranges from 10 at % to 60 at %, and the content of Pr in the B—Bi—Zn—Pr glass ranges from 5 at % to 30 at %.

In accordance with an embodiment, based on the total amount of B, Bi, Zn, and Pr contained in the B—Bi—Zn—Pr glass, the content of B in the B—Bi—Zn—Pr glass ranges from 30 at % to 60 at %, the content of Bi in the B—Bi—Zn—Pr glass ranges from 5 at % to 20 at %, the content of Zn in the B—Bi—Zn—Pr glass ranges from 20 at % to 50 at %, and the content of Pr in the B—Bi—Zn—Pr glass ranges from 10 at % to 20 at %.

In accordance with an embodiment, based on the total amount of B, Bi, Zn, and La contained in the B—Bi—Zn—La glass, the content of B in the B—Bi—Zn—La glass ranges from 20 at % to 70 at %, the content of Bi in the B—Bi—Zn—La glass ranges from 2 at % to 30 at %, the content of Zn in the B—Bi—Zn—La glass ranges from 10 at % to 60 at %, and the content of La in the B—Bi—Zn—La glass ranges from 5 at % to 30 at %.

In accordance with an embodiment, based on the total amount of B, Bi, Zn, and La contained in the B—Bi—Zn—La glass, the content of B in the B—Bi—Zn—La glass ranges from 30 at % to 60 at %, the content of Bi in the B—Bi—Zn—La glass ranges from 5 at % to 20 at %, the content of Zn in the B—Bi—Zn—La glass ranges from 20 at % to 50 at %, and the content of La in the B—Bi—Zn—La glass ranges from 10 at % to 20 at %.

The varistor composition may serve as the raw material for a sintered body of a multilayer varistor. The multilayer varistor comprising the sintered body made from the varistor composition shows good varistor characteristics, such as excellent ESD withstand ability and high surge current. In addition, the varistor composition has no Sb content, thus meeting the need for environmental protection.

In accordance with an embodiment, the total content of the first additive ranges from 1.5 wt % to 5.5 wt % based on the total weight of the varistor composition. Accordingly, the ESD withstanding capability and high surge current of the multilayer varistor made from the varistor composition are further enhanced.

In accordance with an embodiment, the particle size of the first additive ranges from 50 nm to 500 nm. Accordingly, the varistor composition may be made into a multilayer varistor having high density via a sintering process at low sintering temperature.

Another objective of the present invention is to provide a multilayer varistor. The multilayer varistor comprises a sintered body, multiple inner electrodes, a first external electrode, and a second external electrode. The sintered body comprises a first end and a second end opposite the first end. The inner electrodes are arranged in the sintered body at spaced intervals. Each two neighboring inner electrodes are connected with the first end and the second end respectively. The first external electrode is mounted in the first end and contacts corresponding inner electrodes. The second external electrode is mounted in the second end and contacts corresponding inner electrodes. Further, the sintered body is made from the varistor composition mentioned above.

By the sintered body made from the varistor composition mentioned above, the multilayer varistor shows good varistor characteristics, such as excellent ESD withstand ability and high surge current. Besides, the multilayer varistor is environmentally friendly. Therefore, the multilayer varistor may be extensively utilized.

In accordance with an embodiment, the sintered body may be made from the varistor composition mentioned above by a sintering process at a sintering temperature lower than 1200° C. Preferably, the sintering temperature ranges from 900° C. to 1150° C.; more preferably, the sintering temperature ranges from 950° C. to 1100° C.

In accordance with an embodiment, the inner electrodes comprises a Pt—Ag alloy having an amount of Pt less than or equal to 30 wt %, or a Pd—Ag alloy having an amount of Pd less than or equal to 30 wt %.

Accordingly, the multilayer varistor may be made by sintering the varistor composition mentioned above and inner electrodes having low Pt or Pd content under a sintering temperature of 900° C. to 1150° C., so as to lower the fabrication cost and the sintering temperature of the multilayer varistor.

Other objectives, advantages, and novel features of the embodiments of the present invention will become more apparent from the following detailed description when taken in conjunction with the accompanying drawings.

BRIEF DESCRIPTION OF THE DRAWING

FIG. 1 is a schematic cross-sectional view of a multilayer varistor in accordance with the present invention.

DETAILED DESCRIPTION

An embodiment of a varistor composition comprised zinc oxide (ZnO), a first additive, a second additive, a third additive, and a fourth additive. The first additive was selected from the group consisting of: B—Bi—Zn—Pr glass, B—Bi—Zn—La glass, and a mixture thereof. The second additive was selected from the group consisting of: a cobalt compound, a chromium compound, a nickel compound, a manganese compound, and mixtures thereof. The third additive comprised $SnO_2$. The fourth additive was selected from the group consisting of: an aluminum compound, a silver compound, and a mixture thereof. Based on the total weight of the varistor composition, the total content of the first additive ranged from 0.05 wt % to 20 wt %, the individual content of the second additive ranged from 0.1 wt % to 5.0 wt %, the content of the third additive ranged from 0.1 wt % to 1.5 wt %, and the individual content of the fourth additive ranged from 0.001 wt % to 1.0 wt %.

An embodiment of a method of fabricating the said B—Bi—Zn—Pr glass was as follows: $B_2O_3$ powder, $Bi_2O_3$ powder, ZnO powder, and $Pr_6O_{11}$ powder were mixed, ground, and dried to obtain a pretreated powder.

Based on the total amount of $B_2O_3$ powder, $Bi_2O_3$ powder, ZnO powder, and $Pr_6O_{11}$ powder, the amount of $B_2O_3$ powder was 10 wt % to 30 wt %, the amount of $Bi_2O_3$ powder was 10 wt % to 30 wt %, the amount of ZnO powder was 10 wt % to 30 wt %, and the amount of $Pr_6O_{11}$ powder was 10 wt % to 30 wt %. Then the pretreated powder was heated to 500° C. to 900° C. and transformed into a melted substance. The melt substance was sprayed under high pressure to form multiple droplets. The droplets were solidified rapidly and the said B—Bi—Zn—Pr glass was obtained. The particle size of the said B—Bi—Zn—Pr glass was 50 nm to 500 nm.

An embodiment of a method of fabricating the said B—Bi—Zn—La glass was as follows. The method of fabricating the said B—Bi—Zn—La glass was similar to the method of fabricating the said B—Bi—Zn—Pr glass. However, the said B—Bi—Zn—La glass was made from $B_2O_3$ powder, $Bi_2O_3$ powder, ZnO powder, and $La_2O_3$ powder. In addition, based on the total amount of $B_2O_3$ powder, $Bi_2O_3$ powder, ZnO powder, and $La_2O_3$ powder, the amount of $La_2O_3$ powder was 10 wt % to 30 wt %.

With reference to FIG. 1, an embodiment of a multilayer varistor 10 comprised a sintered body 11, multiple inner electrodes 12, 13, a first external electrode 14, and a second external electrode 15. The sintered body 11 comprised a first end and a second end opposite the first end. The inner electrodes 12, 13 are arranged in the sintered body 11 at spaced intervals. Each two neighboring inner electrodes 12, 13 are connected with the first end and the second end respectively. The first external electrode 14 is mounted in the first end and contacts corresponding inner electrodes 12. The second external electrode 15 is mounted in the second end and contacts corresponding inner electrodes 13.

The multilayer varistor was made by a low temperature sintering process. In addition, the multilayer varistor was made from the varistor composition above.

An embodiment of a method of fabricating the multilayer varistor was as follows.

The first additive, the second additive, the third additive, and the fourth additive were blended and an additive blend was obtained. The additive blend was calcined under 750° C. to 950° C. for 2 hours to obtain a calcined powder. The calcined powder was ground to obtain a composite mash. After the composite mash and ZnO powder were blended, a dispersion agent, a binder, a plasticizer, and an organic solvent were added into the composite mash, so as to obtain a ceramic slurry. The ceramic slurry was subjected to a doctor blade process to form green sheets having a thickness of 5 μm to 150 μm.

Subsequently, a number of the green sheets were stacked in sequence to form a top cover having a thickness of 200 μm and a bottom cover having a thickness of 200 μm. One of the said inner electrodes was printed on the top cover and the printed top cover was dried. Multiple green sheets having a thickness of 30 μm were stacked in sequence on the bottom cover, wherein the green sheets having the thickness of 30 μm were printed with the other inner electrodes respectively before stacked on the bottom cover, and the inner electrodes were platinum (Pt), palladium (Pd), gold (Au), silver (Ag), nickel (Ni), or an alloy of any two of these metals. The printed top cover was covered on the uppermost green sheet having the thickness of 30 μm; then the printed top cover, the green sheets having the thickness of 30 μm, and the bottom cover were bonded by pressing, and thereby forming a laminate.

Subsequently, the laminate was cut into multiple green compacts. The green compacts were baked at 300° C. to 600° C. to burn out the binder. After the binder was burnt out, the green compacts were sintered at 900° C. to 1200° C. to obtain the sintered body. The first external electrode and the second external electrode were burn-attached on two opposite ends of the sintered body respectively and the multilayer varistor was obtained. The first external electrode comprised silver (Ag) or copper (Cu). The second external electrode comprised Ag or Cu. Preferably, the burning out temperature was 400° C. and the sintering temperature was 950° C. to 1050° C.

Hereinafter, one skilled in the arts can easily realize the advantages and effects of the instant disclosure from the following examples. Therefore, it should be understood that the descriptions proposed herein are just preferable examples for the purpose of illustrations only, not intended to limit the scope of the disclosure. Various modifications and variations could be made in order to practice or apply the instant disclosure without departing from the spirit and scope of the disclosure.

Example 1: Preparation of B—Bi—Zn—Pr Glass $B_2O_3$ powder, $Bi_2O_3$ powder, ZnO powder, and $Pr_6O_{11}$ powder were mixed, ground, and dried to obtain a pretreated powder. The weight ratio of $B_2O_3$ powder, $Bi_2O_3$ powder, ZnO powder, and $Pr_6O_{11}$ powder was 20:20:30:30. The pretreated powder was heated to 850° C. and transformed into a melt substance. The melt substance was sprayed under high pressure to form multiple droplets. The droplets were solidified rapidly and the B—Bi—Zn—Pr glass of the present example was obtained. The particle size of the B—Bi—Zn—Pr glass of the present example was 200 nm. The components of the B—Bi—Zn—Pr glass of the present example were shown in Table 1.

TABLE 1 the components of the B—Bi—Zn—Pr glass of example 1 and the components of the B—Bi—Zn—La glass of example 1

| Example No. | B | Bi | Zn | Pr | La | Total |
|---|---|---|---|---|---|---|
| 1 | 47.68 at % | 7.12 at % | 30.58 at % | 14.62 at % | 0.00 at % | 100 at % |
| 2 | 47.36 at % | 7.08 at % | 30.38 at % | 0.00 at % | 15.18 at % | 100 at % |

Example 2: Preparation of B—Bi—Zn—La Glass $B_2O_3$ powder, $Bi_2O_3$ powder, ZnO powder, and $La_2O_3$ powder were mixed, ground, and dried to obtain a pretreated powder. The weight ratio of $B_2O_3$ powder, $Bi_2O_3$ powder, ZnO powder, and $La_2O_3$ powder was 20:20:30:30. The pretreated powder was heated to 850° C. and transformed into a melt substance. The melt substance was sprayed under high pressure to form multiple droplets. The droplets were solidified rapidly and the B—Bi—Zn—La glass of the present example was obtained. The particle size of the B—Bi—Zn—La glass of the present example was 200 nm. The components of the B—Bi—Zn—La glass of the present example were shown in Table 1.

Examples 3 to 8: Preparation of Multilayer Varistor

In examples 3 to 8, the B—Bi—Zn—Pr glass of example 1, $Co_3O_4$, $Cr_2O_3$, $Mn_2O$, NiO, $SnO_2$, $AgNO_3$, $Al(NO_3)_3$, and ZnO according to the weight percentages shown in Table 2 were applied as the raw materials to prepare the multilayer varistors as follows.

The B—Bi—Zn—Pr glass of example 1, $Co_3O_4$, $Cr_2O_3$, $Mn_2O$, NiO, $SnO_2$, $AgNO_3$, and $Al(NO_3)_3$ were blended and an additive blend was obtained. After grinding, the additive blend was calcined under 850° C. for 2 hours and a calcined powder was obtained. The calcined powder was ball-ground and a composite mash was obtained. After the composite mash and ZnO powder were blended, a dispersion agent, a binder, a plasticizer, and an organic solvent were added, so as to obtain a ceramic slurry. The ceramic slurry was subjected to a doctor blade process to form green sheets having a thickness of 30 μm. The plasticizer was an alcohol plasticizer or an ester plasticizer. In examples 3 to 8, the binder was polyvinyl butyral and the plasticizer was triethylene glycol bis(2-ethylhexanoate). Based on the weight of the ceramic slurry, the amount of the dispersion agent was 1 wt %, the amount of the binder was 10 wt %, and the amount of the plasticizer was 2 wt %.

Subsequently, a number of the green sheets were stacked in sequence to form a top cover having a thickness of 200 μm and a bottom cover having a thickness of 200 μm. One inner electrode was printed on the top cover and the printed top cover was dried. Multiple green sheets having a thickness of 30 μm were stacked in sequence on the bottom cover, wherein the green sheets having the thickness of 30 μm were printed with the other inner electrodes respectively before being stacked on the bottom cover. The printed top cover was covered on the uppermost green sheet having the thickness of 30 μm; then the printed top cover, the green sheets having the thickness of 30 μm, and the bottom cover were bonded by pressing, and thereby forming a laminate. In examples 3 to 8, each of the inner electrodes was an Ag—Pd alloy having an Ag-to-Pd weight ratio of 70:30.

Subsequently, the laminate was cut into multiple green compacts having a length of 1.0 millimeters (mm), a width of 0.55 mm and a height of 0.55 mm. The green compacts were baked at 400° C. for 24 hours to burn out the binder. After the binder was burnt out, the green compacts were sintered at 1000° C. for 2 hours and the sintered body was obtained. A first external electrode and a second external electrode were burn-attached on two opposite ends of the sintered body at 750° C. and the multilayer varistor was obtained. The first and the second external electrodes both comprised Ag.

Examples 9 to 14: Preparation of Multilayer Varistor

In examples 9 to 14, multilayer varistors were prepared in the similar manner as examples 3 to 8 except that the B—Bi—Zn—La glass of example 2, $Co_3O_4$, $Cr_2O_3$, $Mn_2O$, NiO, $SnO_2$, $AgNO_3$, $Al(NO_3)_3$, and ZnO according to the weight percentages shown in Table 2 were used as the raw materials to prepare the multilayer varistors of examples 9 to 14.

Examples 15 to 19: Preparation of Multilayer Varistor

In examples 15 to 19, the multilayer varistors were prepared in the similar manner as examples 3 to 8 except that the B—Bi—Zn—Pr glass of example 1, the B—Bi—Zn—La glass of example 2, $Co_3O_4$, $Cr_2O_3$, $Mn_2O$, NiO, $SnO_2$, $AgNO_3$, $Al(NO_3)_3$, and ZnO according to the weight percentages shown in Table 2 were used as the raw materials to prepare the multilayer varistors of examples 15 to 19.

Examples 20 to 26: Preparation of Multilayer Varistor

In examples 20 to 26, the multilayer varistors were prepared in the similar manner as examples 3 to 8 except that the weight percentages of the components in the raw materials to prepare the multilayer varistors of examples 20 to 26 were shown in Table 3.

Examples 27 to 33: Preparation of Multilayer Varistor

In examples 27 to 33, the multilayer varistors were prepared in the similar manner as examples 9 to 14 except that the weight percentages of the components in the raw materials to prepare the multilayer varistors of examples 27 to 33 were shown in Table 3.

Comparative Example: Preparation of Multilayer Varistor

In the comparative example, a multilayer varistor was prepared in the similar manner as examples 3 to 26 except that the raw material of the comparative example did not comprise the B—Bi—Zn—Pr glass of example 1 and the B—Bi—Zn—La glass of example 2, and the weight percentages of the components in the raw material of the comparative example were shown in Table 4.

TABLE 2 components in the raw materials of examples 3 to 19

| Example No. | ZnO | B—Bi—Zn—Pr glass | B—Bi—Zn—La glass | $Co_3O_4$ | $Cr_2O_3$ |
|---|---|---|---|---|---|
| 3 | 95.35 wt % | 0.05 wt % | 0 wt % | 1.0 wt % | 1.0 wt % |
| 4 | 93.4 wt % | 2.0 wt % | 0 wt % | 1.0 wt % | 1.0 wt % |
| 5 | 90.4 wt % | 5.0 wt % | 0 wt % | 1.0 wt % | 1.0 wt % |
| 6 | 85.4 wt % | 10.0 wt % | 0 wt % | 1.0 wt % | 1.0 wt % |
| 7 | 80.4 wt % | 15.0 wt % | 0 wt % | 1.0 wt % | 1.0 wt % |
| 8 | 75.4 wt % | 20.0 wt % | 0 wt % | 1.0 wt % | 1.0 wt % |
| 9 | 95.35 wt % | 0 wt % | 0.05 wt % | 1.0 wt % | 1.0 wt % |
| 10 | 93.4 wt % | 0 wt % | 2.0 wt % | 1.0 wt % | 1.0 wt % |
| 11 | 90.4 wt % | 0 wt % | 5.0 wt % | 1.0 wt % | 1.0 wt % |
| 12 | 85.4 wt % | 0 wt % | 10.0 wt % | 1.0 wt % | 1.0 wt % |
| 13 | 80.4 wt % | 0 wt % | 15.0 wt % | 1.0 wt % | 1.0 wt % |
| 14 | 75.4 wt % | 0 wt % | 20.0 wt % | 1.0 wt % | 1.0 wt % |
| 15 | 93.4 wt % | 1.0 wt % | 1.0 wt % | 1.0 wt % | 1.0 wt % |
| 16 | 90.4 wt % | 2.5 wt % | 2.5 wt % | 1.0 wt % | 1.0 wt % |
| 17 | 85.4 wt % | 5.0 wt % | 5.0 wt % | 1.0 wt % | 1.0 wt % |
| 18 | 80.4 wt % | 7.5 wt % | 7.5 wt % | 1.0 wt % | 1.0 wt % |
| 19 | 75.4 wt % | 10 wt % | 10 wt % | 1.0 wt % | 1.0 wt % |

| Example No. | $Mn_2O$ | NiO | $SnO_2$ | $AgNO_3$ | $Al(NO_3)_3$ | Total |
|---|---|---|---|---|---|---|
| 3 | 1.0 wt % | 1.0 wt % | 0.5 wt % | 0.05 wt % | 0.05 wt % | 100 wt % |
| 4 | 1.0 wt % | 1.0 wt % | 0.5 wt % | 0.05 wt % | 0.05 wt % | 100 wt % |
| 5 | 1.0 wt % | 1.0 wt % | 0.5 wt % | 0.05 wt % | 0.05 wt % | 100 wt % |
| 6 | 1.0 wt % | 1.0 wt % | 0.5 wt % | 0.05 wt % | 0.05 wt % | 100 wt % |
| 7 | 1.0 wt % | 1.0 wt % | 0.5 wt % | 0.05 wt % | 0.05 wt % | 100 wt % |
| 8 | 1.0 wt % | 1.0 wt % | 0.5 wt % | 0.05 wt % | 0.05 wt % | 100 wt % |
| 9 | 1.0 wt % | 1.0 wt % | 0.5 wt % | 0.05 wt % | 0.05 wt % | 100 wt % |
| 10 | 1.0 wt % | 1.0 wt % | 0.5 wt % | 0.05 wt % | 0.05 wt % | 100 wt % |
| 11 | 1.0 wt % | 1.0 wt % | 0.5 wt % | 0.05 wt % | 0.05 wt % | 100 wt % |
| 12 | 1.0 wt % | 1.0 wt % | 0.5 wt % | 0.05 wt % | 0.05 wt % | 100 wt % |
| 13 | 1.0 wt % | 1.0 wt % | 0.5 wt % | 0.05 wt % | 0.05 wt % | 100 wt % |
| 14 | 1.0 wt % | 1.0 wt % | 0.5 wt % | 0.05 wt % | 0.05 wt % | 100 wt % |
| 15 | 1.0 wt % | 1.0 wt % | 0.5 wt % | 0.05 wt % | 0.05 wt % | 100 wt % |
| 16 | 1.0 wt % | 1.0 wt % | 0.5 wt % | 0.05 wt % | 0.05 wt % | 100 wt % |
| 17 | 1.0 wt % | 1.0 wt % | 0.5 wt % | 0.05 wt % | 0.05 wt % | 100 wt % |
| 18 | 1.0 wt % | 1.0 wt % | 0.5 wt % | 0.05 wt % | 0.05 wt % | 100 wt % |
| 19 | 1.0 wt % | 1.0 wt % | 0.5 wt % | 0.05 wt % | 0.05 wt % | 100 wt % |

TABLE 3 components in the raw materials of examples 20 to 33

| Example No. | ZnO | B—Bi—Zn—Pr glass | B—Bi—Zn—La glass | $Co_3O_4$ | $Cr_2O_3$ |
|---|---|---|---|---|---|
| 20 | 97.498 wt % | 2.0 wt % | 0 wt % | 0.1 wt % | 0.1 wt % |
| 21 | 93.898 wt % | 2.0 wt % | 0 wt % | 1.0 wt % | 1.0 wt % |
| 22 | 77.898 wt % | 2.0 wt % | 0 wt % | 5.0 wt % | 5.0 wt % |
| 23 | 92.998 wt % | 2.0 wt % | 0 wt % | 1.0 wt % | 1.0 wt % |
| 24 | 92.498 wt % | 2.0 wt % | 0 wt % | 1.0 wt % | 1.0 wt % |
| 25 | 92.9 wt % | 2.0 wt % | 0 wt % | 1.0 wt % | 1.0 wt % |
| 26 | 91 wt % | 2.0 wt % | 0 wt % | 1.0 wt % | 1.0 wt % |
| 27 | 97.498 wt % | 0 wt % | 2.0 wt % | 0.1 wt % | 0.1 wt % |
| 28 | 93.898 wt % | 0 wt % | 2.0 wt % | 1.0 wt % | 1.0 wt % |
| 29 | 77.898 wt % | 0 wt % | 2.0 wt % | 5.0 wt % | 5.0 wt % |
| 30 | 92.998 wt % | 0 wt % | 2.0 wt % | 1.0 wt % | 1.0 wt % |
| 31 | 92.498 wt % | 0 wt % | 2.0 wt % | 1.0 wt % | 1.0 wt % |
| 32 | 92.9 wt % | 0 wt % | 2.0 wt % | 1.0 wt % | 1.0 wt % |
| 33 | 91 wt % | 0 wt % | 2.0 wt % | 1.0 wt % | 1.0 wt % |

| Example No. | $Mn_2O$ | NiO | $SnO_2$ | $AgNO_3$ | $Al(NO_3)_3$ | Total |
|---|---|---|---|---|---|---|
| 20 | 0.1 wt % | 0.1 wt % | 0.1 wt % | 0.001 wt % | 0.001 wt % | 100 wt % |
| 21 | 1.0 wt % | 1.0 wt % | 0.1 wt % | 0.001 wt % | 0.001 wt % | 100 wt % |
| 22 | 5.0 wt % | 5.0 wt % | 0.1 wt % | 0.001 wt % | 0.001 wt % | 100 wt % |
| 23 | 1.0 wt % | 1.0 wt % | 1.0 wt % | 0.001 wt % | 0.001 wt % | 100 wt % |
| 24 | 1.0 wt % | 1.0 wt % | 1.5 wt % | 0.001 wt % | 0.001 wt % | 100 wt % |
| 25 | 1.0 wt % | 1.0 wt % | 1.0 wt % | 0.05 wt % | 0.05 wt % | 100 wt % |
| 26 | 1.0 wt % | 1.0 wt % | 1.0 wt % | 1.0 wt % | 1.0 wt % | 100 wt % |
| 27 | 0.1 wt % | 0.1 wt % | 0.1 wt % | 0.001 wt % | 0.001 wt % | 100 wt % |
| 28 | 1.0 wt % | 1.0 wt % | 0.1 wt % | 0.001 wt % | 0.001 wt % | 100 wt % |
| 29 | 5.0 wt % | 5.0 wt % | 0.1 wt % | 0.001 wt % | 0.001 wt % | 100 wt % |

TABLE 3-continued components in the raw materials of examples 20 to 33

| 30 | 1.0 wt % | 1.0 wt % | 1.0 wt % | 0.001 wt % | 0.001 wt % | 100 wt % |
| 31 | 1.0 wt % | 1.0 wt % | 1.5 wt % | 0.001 wt % | 0.001 wt % | 100 wt % |
| 32 | 1.0 wt % | 1.0 wt % | 1.0 wt % | 0.05 wt % | 0.05 wt % | 100 wt % |
| 33 | 1.0 wt % | 1.0 wt % | 1.0 wt % | 1.0 wt % | 1.0 wt % | 100 wt % |

TABLE 4 components in the raw materials of comparative example

| | ZnO | B—Bi—Zn—Pr glass | B—Bi—Zn—La glass | $Co_3O_4$ | $Cr_2O_3$ |
|---|---|---|---|---|---|
| Comparative Example | 95.4 wt % | 0 wt % | 0 wt % | 1.0 wt % | 1.0 wt % |

| | $Mn_2O$ | NiO | $SnO_2$ | $AgNO_3$ | $Al(NO_3)_3$ | Total |
|---|---|---|---|---|---|---|
| Comparative Example | 1.0 wt % | 1.0 wt % | 0.5 wt % | 0.05 wt % | 0.05 wt % | 100 wt % |

Test: Varistor Characteristics

Breakdown voltage: the breakdown voltage ($V_{1\ mA}$) of each of the multilayer varistors of examples 3 to 33 and the comparative example was measured under a current of 1 mA.

Non-linear exponent: the non-linear exponent ($\alpha$) of each of the multilayer varistors of examples 3 to 33 and the comparative example was calculated from the I-V characteristic curve of each of the multilayer varistors of examples 3 to 33 and the comparative example.

Maximum surge current: The maximum surge current ($I_M$) of each of the multilayer varistors of examples 3 to 33 and the comparative example was measured when an impulse current of 8/20 μs was applied once and the permissible variation in the breakdown voltage change was 10%.

ESD withstand ability: Each of the multilayer varistors of examples 3 to 33 and the comparative example was measured when applied with ESD 10 times based on the contact discharge mode of IEC 61000-4-2. According to the contact discharge mode, the test voltage was 8 kV to 30 kV. The ESD withstand ability of each of the multilayer varistors of examples 3 to 33 and the comparative example was evaluated by the highest test voltage while the variation in the breakdown voltage change of each of the same was within 10%.

The breakdown voltage ($V_{1\ mA}$), the non-linear exponent ($\alpha$), the maximum surge current ($I_M$), and the ESD withstand ability of each of the multilayer varistors of examples 3 to 33 and the comparative example were shown in Tables 5 and 6.

TABLE 5 test results of the multilayer varistors of examples 3 to 33

| Example No. | Breakdown voltage ($V_{1mA}$) | Non-linear exponent ($\alpha$) | Maximum surge current ($I_M$) | ESD withstand ability |
|---|---|---|---|---|
| 3 | 84.2 V | 25.1 | 10 A | 10 kV |
| 4 | 30.4 V | 45.4 | 20 A | 30 kV |
| 5 | 20.7 V | 35.6 | 20 A | 30 kV |
| 6 | 18.5 V | 28.5 | 20 A | 25 kV |
| 7 | 10.3 V | 18.0 | 20 A | 15 kV |
| 8 | 7.6 V | 12.7 | 15 A | 10 kV |
| 9 | 72.4 V | 21.2 | 10 A | 10 kV |
| 10 | 26.1 V | 41.2 | 20 A | 30 kV |
| 11 | 18.2 V | 32.3 | 20 A | 30 kV |
| 12 | 15.4 V | 24.4 | 20 A | 25 kV |
| 13 | 10.6 V | 14.6 | 15 A | 15 kV |
| 14 | 8.4 V | 10.4 | 15 A | 10 kV |
| 15 | 28.4 V | 43.2 | 20 A | 30 kV |
| 16 | 17.7 V | 32.4 | 20 A | 30 kV |
| 17 | 15.5 V | 24.5 | 20 A | 25 kV |
| 18 | 9.3 V | 14.6 | 20 A | 15 kV |
| 19 | 8.6 V | 10.8 | 15 A | 10 kV |
| 20 | 20.3 V | 34.2 | 20 A | 30 kV |
| 21 | 28.2 V | 44.4 | 20 A | 30 kV |
| 22 | 42.6 V | 36.8 | 20 A | 30 kV |
| 23 | 36.1 V | 42.7 | 20 A | 30 kV |
| 24 | 36.8 V | 41.2 | 20 A | 30 kV |
| 25 | 35.2 V | 45.6 | 20 A | 30 kV |
| 26 | 36.0 V | 38.4 | 20 A | 30 kV |
| 27 | 18.6 V | 32.1 | 20 A | 30 kV |
| 28 | 27.8 V | 42.2 | 20 A | 30 kV |
| 29 | 40.3 V | 36.3 | 20 A | 30 kV |
| 30 | 34.6 V | 41.5 | 20 A | 30 kV |
| 31 | 32.5 V | 40.4 | 20 A | 30 kV |
| 32 | 34.0 V | 42.5 | 20 A | 30 kV |
| 33 | 35.5 V | 36.0 | 20 A | 30 kV |

TABLE 6 test results of the multilayer varistor of comparative example

| | Breakdown voltage ($V_{1mA}$) | Non-linear exponent ($\alpha$) | Maximum surge current ($I_M$) | ESD withstand ability |
|---|---|---|---|---|
| comparative example | 2 V | 0 | 0 A | 0 kV |

As mentioned above, compared to the raw materials of examples 3 to 33, the raw material of the comparative example did not comprise the B—Bi—Zn—Pr glass of example 1 and the B—Bi—Zn—La glass of example 2. As shown in Table 5, each of the multilayer varistors of example 3 to 33 had a breakdown voltage ($V_{1\ mA}$) more than 6 V, a non-linear exponent ($\alpha$) more than 10, a maximum surge current ($I_M$) more than or equal to 10 A, and an ESD withstand ability more than or equal to 10 kV.

As shown in Table 6, the multilayer varistor of the comparative example had a breakdown voltage ($V_{1\ mA}$) of 2 V, a non-linear exponent ($\alpha$) of 0, and a maximum surge current ($I_M$) of 0 A; in addition, the multilayer varistor of the comparative example failed to pass the ESD withstand ability test, and therefore, the ESD withstand ability was recorded as 0 kV in Table 6. Accordingly, proof had been made that each of the multilayer varistors of examples 3 to 33 had good varistor characteristics, such as good breakdown voltage, non-linear exponent, maximum surge current, and ESD withstand ability.

To sum up, the said varistor composition was capable of applying to the sintering process having the sintering temperature less than 1200° C. with inner electrodes made of Pt—Ag alloy having the amount of Pt less than or equal to 30 wt %, or Pd—Ag alloy having the amount of Pd less than or equal to 30 wt % to obtain the said multilayer varistor. As such, the fabrication cost of the said multilayer varistor was lowered. Further, the said multilayer varistor showed good breakdown voltage, good non-linear exponent, good maximum surge current, and good ESD withstand ability. Therefore, the said multilayer varistor had an extensive application.

What is claimed is:

1. A varistor composition free of Sb comprising:
   zinc oxide;
   a first additive selected from the group consisting of: boron-bismuth-zinc-praseodymium glass (B—Bi—Zn—Pr glass), boron-bismuth-zinc-lanthanum glass (B—Bi—Zn—La glass), and a mixture thereof;
   a second additive selected from the group consisting of: a cobalt compound, a chromium compound, a nickel compound, a manganese compound, and mixtures thereof;
   a third additive comprising tin dioxide; and
   a fourth additive selected from the group consisting of: an aluminum compound, a silver compound, and a mixture thereof;
   wherein based on the total amount of B, Bi, Zn, and Pr contained in the B—Bi—Zn—Pr glass, the content of B in the B—Bi—Zn—Pr glass ranges from 20 at % to 70 at %, the content of Bi in the B—Bi—Zn—Pr glass ranges from 2 at % to 30 at %, the content of Zn in the B—Bi—Zn—Pr glass ranges from 10 at % to 60 at %, and the content of Pr in the B—Bi—Zn—Pr glass ranges from 5 at % to 30 at %;
   wherein based on the total amount of B, Bi, Zn, and La contained in the B—Bi—Zn—La glass, the content of B in the B—Bi—Zn—La glass ranges from 20 at % to 70 at %, the content of Bi in the B—Bi—Zn—La glass ranges from 2 at % to 30 at %, the content of Zn in the B—Bi—Zn—La glass ranges from 10 at % to 60 at %, and the content of La in the B—Bi—Zn—La glass ranges from 5 at % to 30 at %;
   wherein based on the total weight of the varistor composition, the total content of the first additive ranges from 0.05 wt % to 20 wt %, the individual content of the second additive ranges from 0.1 wt % to 5.0 wt %, the content of the third additive ranges from 0.1 wt % to 1.5 wt %, and the individual content of the fourth additive ranges from 0.001 wt % to 1.0 wt %.

2. The varistor composition free of Sb as claimed in claim 1, wherein the cobalt compound of the second additive is selected from the group consisting of: a cobalt oxide, cobalt hydroxide, a percobaltate, cobalt carbonate, cobalt phosphate, and mixtures thereof;
   the chromium compound of the second additive is selected from the group consisting of: a chromium oxide, a dichromate salt, a chromium boride compound, a chromium nitride compound, and mixtures thereof;
   the nickel compound of the second additive is selected from the group consisting of: a nickel oxide, nickel carbonate, nickel nitrate, and mixtures thereof; and
   the manganese compound of the second additive is selected from the group consisting of: a manganese oxide, manganese carbonate, manganese nitrate, manganese borohydride, and mixtures thereof.

3. The varistor composition free of Sb as claimed in claim 1, wherein the aluminum compound of the fourth additive is selected from the group consisting of: an aluminum oxide, aluminium nitrate, and a mixture thereof.

4. The varistor composition free of Sb as claimed in claim 2, wherein the aluminum compound of the fourth additive is selected from the group consisting of: an aluminum oxide, aluminium nitrate, and a mixture thereof.

5. The varistor composition free of Sb as claimed in claim 1, wherein the second additive is the mixture of the cobalt compound, the chromium compound, the nickel compound, and the manganese compound; and
   based on the total weight of the varistor composition, the total content of the second additive ranges from 0.4 wt % to 20.0 wt %.

6. The varistor composition free of Sb as claimed in claim 4, wherein the second additive is the mixture of the cobalt compound, the chromium compound, the nickel compound, and the manganese compound; and
   based on the total weight of the varistor composition, the total content of the second additive ranges from 0.4 wt % to 20.0 wt %.

7. The varistor composition free of Sb as claimed in claim 1, wherein the fourth additive is the mixture of the aluminum compound and the silver compound; and
   based on the total weight of the varistor composition, the total content of the fourth additive ranges from 0.002 wt % to 2.0 wt %.

8. The varistor composition free of Sb as claimed in claim 6, wherein the fourth additive is the mixture of the aluminum compound and the silver compound; and
   based on the total weight of the varistor composition, the total content of the fourth additive ranges from 0.002 wt % to 2.0 wt %.

9. The varistor composition free of Sb as claimed in claim 1, wherein the particle size of the first additive ranges from 50 nm to 500 nm.

10. The varistor composition free of Sb as claimed in claim 8, wherein the particle size of the first additive ranges from 50 nm to 500 nm.

11. The varistor composition free of Sb as claimed in claim 1, wherein the total content of the first additive ranges from 1.5 wt % to 5.5 wt % based on the total weight of the varistor composition.

12. The varistor composition free of Sb as claimed in claim 10, wherein the total content of the first additive ranges from 1.5 wt % to 5.5 wt % based on the total weight of the varistor composition.

13. The varistor composition free of Sb as claimed in claim 1, wherein the third additive comprises silicon dioxide or germanium dioxide.

14. The varistor composition free of Sb as claimed in claim 12, wherein the third additive comprises silicon dioxide or germanium dioxide.

15. A multilayer varistor comprising:
a sintered body comprising a first end and a second end opposite the first end;
multiple inner electrodes arranged in the sintered body at spaced intervals, each two neighboring inner electrodes connected with the first end and the second end respectively;
a first external electrode mounted in the first end and contacting corresponding inner electrodes; and
a second external electrode mounted in the second end and contacting corresponding inner electrodes;
wherein the sintered body is made from the varistor composition free of Sb as claimed in claim 1.

16. The multilayer varistor as claimed in claim 15, wherein the inner electrodes comprises a Pt—Ag alloy having an amount of Pt less than or equal to 30 wt %, or a Pd—Ag alloy having an amount of Pd less than or equal to 30 wt %.

* * * * *